United States Patent [19]
Doi et al.

[11] Patent Number: 5,331,681
[45] Date of Patent: Jul. 19, 1994

[54] FUNCTION ADJUSTABLE SIGNAL PROCESSING DEVICE

[75] Inventors: Nobukazu Doi, Hachioji; Tohru Setoyama, Kokubunji, both of Japan

[73] Assignee: Hitachi, Ltd., Tokyo, Japan

[21] Appl. No.: 865,884

[22] Filed: Apr. 9, 1992

[30] Foreign Application Priority Data

Apr. 17, 1991 [JP] Japan .................................. 3-085024

[51] Int. Cl.⁵ .................................................. G06F 13/00
[52] U.S. Cl. .................................. 377/116; 307/482.1;
365/189.12; 395/325
[58] Field of Search .................... 377/104, 105, 78, 79,
377/115, 116, 117, 55, 73; 365/189.12, 221;
395/325

[56] References Cited

U.S. PATENT DOCUMENTS

| | | | |
|---|---|---|---|
| 3,636,376 | 1/1972 | Hoffmann | 377/78 |
| 4,611,337 | 9/1986 | Evans | 377/116 |
| 4,697,279 | 9/1987 | Baratti et al. | 377/73 |
| 4,727,559 | 2/1988 | Yokoyama et al. | 347/116 |

FOREIGN PATENT DOCUMENTS 0255864 10/1989 Japan .

Primary Examiner—John S. Heyman
Attorney, Agent, or Firm—Antonelli, Terry, Stout & Kraus

[57] ABSTRACT

A signal processing device is provided with a plurality of signal processing circuits which are integrated on a monolithic semiconductor chip and which execute a plurality of predetermined signal processing stages. Signal input terminals are connected with predetermined one of the signal processing circuits for receiving input signals necessary for the plurality of signal processing stages. A first signal output circuit outputs the final signal processing result while a second signal output circuit outputs the intermediate processing results obtained from the signal processing circuits other than a signal processing circuit which performs the final stage signal processing. A plurality of selection circuits are respectively located on each of signal transfer paths for transferring the intermediate signal processing result to a succeeding signal processing circuit. Each selection circuit is provided with supplemental signal input terminals for externally receiving signals, respectively, and each of said selection can serve to select either of the intermediate signal processing result or the signal received at a supplemental signal input terminal on the basis of a predetermined control signal, with the selected signal being supplied to the succeeding signal processing circuit.

8 Claims, 5 Drawing Sheets

| A | EN | Y |
|---|----|---|
| 0 | 1  | 0 |
| 1 | 1  | 1 |
| 0 | 0  | HIGH IMPEDANCE |
| 1 | 0  | HIGH IMPEDANCE |

FUNCTION ADJUSTABLE SIGNAL PROCESSING DEVICE

BACKGROUND OF THE INVENTION

1. Field of the Invention

The present invention relates to a signal processing device, and more particularly to a signal processing device which can be suitably applied to where a certain function is to be added to, to be removed from, or to be replaceably compensated for in it.

2. Description of the Related Art

Often a signal processing device requiring high speed signal processing has been realized by a wired logic circuit in which logic gates are connected by wirings. In order to implement conditions of small size, light weight, low power consumption and high speed, such a signal processing device has been integrated on a monolithic or plural LSIs with the aid of gate arrays, standard cells, full-custom. With development of semiconductor miniaturized-processing technology, the number of transistors which can be integrated on a monolithic LSI has been increased every year and an integration degree in signal processing device is getting increased. A new function can be added to the conventional signal processing device in such a manner that the signal extracted from the device is processed to provide the new function by e.g. another signal processing device and the processed signal is taken in the device again. However, because of the problems about power consumption, the number of input/output terminals of a package, the number of pads on a semiconductor chip, etc. generally, the high-integrated conventional signal processing device has a limited input/output means including an input terminal for inputting the signal to be processed, an output terminal for outputting the processed signal, a test terminal for failure diagnosis of the signal processing device, a power supply terminal and a ground terminal. Nevertheless, in order to add the new function to the signal processing device, as the case may be, the signal which cannot be inputted or outputted by the above limited input/output means must be inputted or outputted. Under such a circumstance, the conventional signal processing device cannot be used to add the new function to itself, but an individual signal processing device provided with a new function must be newly fabricated. Such a problem applies to not only to the above case where a new function is to be added, but also to the cases where a certain function is to be removed and where the function at a poor operation part due to erroneous circuit design and causes on semiconductor fabrication is to be replaceably compensated for.

There have been some proposals for providing flexibility in signal processing through software processing as disclosed in JP-A-1-255864, but no proposal for realizing flexibility in wired-logic structure.

SUMMARY OF THE INVENTION

In order to solve the problems relative to the conventional signal processing device, the signal processing device according to the present invention comprises a plurality of signal processing means corresponding to predetermined processing units, each signal processing means being provided with signal input/output means for signal input/output between the signal processing device and an external device, and selection means for selecting either of the signal outputted from the signal processing means and that inputted from the external device to supply the selected signal to succeeding signal processing means.

The usual operation can be carried out in such a manner that the selection means selects the signal outputted from the signal processing means constituting the signal processing device, but not that supplied from a signal input/output (I/O) terminal, to successively send the selected signal to its succeeding signal processing means. The operation of adding a new function can be carried out in such a manner that the signal input/output means outputs the signal necessary to add the new function to the signal processing device through the signal processing means and also inputs the signal processed to provide the new function, and the selection means sends it to the signal processing means. Provision of these signal input/output means and selection means permits a new function to be inserted at any position of a plurality of signal processing means provided correspondingly to predetermined processing units.

It is needless to say that the signal processing means for adding a new function may be previously incorporated in the signal processing device under an non-operating state. Further, the operation of removing or compensating for a certain function in the signal processing device can be carried out in the same way as the operation of adding the new function.

Thus, in accordance with the signal processing device according to the present invention, where a new function is to be added to, a certain function is to be removed from and a partial function is to be compensated for in the device, the signal processing device can be used, as it is, without being newly designed unlike the prior art. Since the signal processing means for realizing the above changes is smaller in size then the signal processing device, development cost or time involved with the changes can be greatly reduced.

The above and other object and features will be more apparent from the following description taken in conjunction with the accompanying drawings.

DESCRIPTION OF THE PREFERRED EMBODIMENTS

Figure 1:
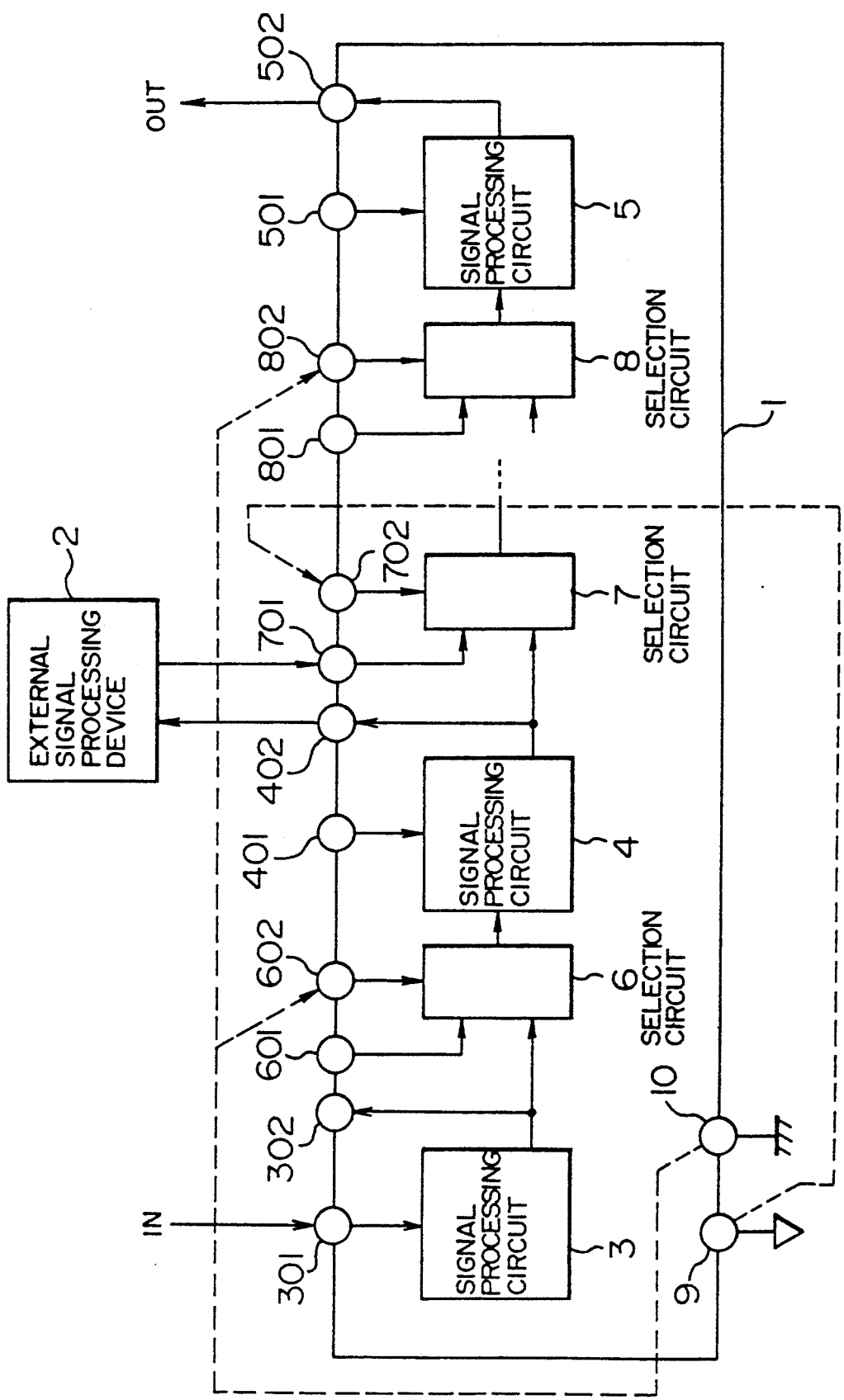
FIG. 1 is a block diagram of a first embodiment of the signal processing device according to the present invention.

Now referring to the accompanying drawings, an explanation will be given of several embodiments of the present invention. All corresponding parts of the various FIGURES are designated by the same reference numerals.

Embodiment 1

FIG. 1 shows, in block form, a first embodiment of the present invention. A signal processing device 1 comprises signal processing circuits 3, 4, and 5, selection circuits 6, 7, and 8, and signal input/output (I/O) terminals 301, 302, 401, 402, 501, 502, 601, 602, 701, 702, 801, 802, 9, and 10. The signal processing circuits 3, 4, and 5 are signal processing circuits provided for the corresponding units of a processing, e.g., a pipeline processing of the signal processing device 1. These signal processing circuits can perform the signal I/O between the signal processing device 1 and an external device through the corresponding signal I/O terminals 301, 302; 401, 402; and 501, 502. The selection circuits 6, 7, and 8 select either of the signal outputted from the signal processing circuits 3, 4, and 5 and the signal inputted through the signal I/O terminals 601, 701 and 801 on the basis of the control signal inputted through the control signal I/O terminals 602, 702 and 802. It should be noted that the signal I/O terminals include a power supply terminal 9 and a ground terminal 10. It should be noted that the signal processing device 1 is connected with an external signal processing circuit 2 through the signal I/O terminals 402 and 701.

In accordance with this embodiment, the operation of the signal processing device 1 using the signal processing circuits 3, 4, and 5 is performed in such a manner that the selection circuits 6, 7 and 8 select the signal outputted from the corresponding signal processing circuits 3, 4 and 5 on the basis of the control signal inputted through the corresponding control signal input terminals 602, 702 and 802. In this case, the selection circuits 6, 7, and 8 are controlled in such as way that if the voltage at the ground terminal 10 (low level) as a control signal is applied to the control signal input terminals 602, 702 and 802, they select the signal outputted from the signal processing circuits 3 and 4 located at the preceding selection circuit stage and from the selection circuit 7 whereas voltage at the power supply terminal 9 (high level) as the control signal is applied to the terminals 602, 702 and 802, they select the signal inputted through the signal input terminals 601, 701 and 801.

Where the function of the external signal processing device 2 as shown in FIG. 1 is to be added to the signal processing device 1, therefore, the I/O terminals 402 and 701 are connected with the external signal device 2, the control signal input terminals 602 and 802 are connected with the ground terminal 10, and the control signal input terminal 702 is connected with the power supply terminal 9. Thus, the signal outputted from the signal processing circuit 4 is sent to the external signal processing device 2 through the signal output terminal 402. The signal, after it has been subjected to a new processing in the external signal processing device 2, will be supplied to the selection circuit 7 through the signal input terminal 701 and further sent to the signal processing circuit 5 via the selection circuit 8. In this way, in addition to the functions of the signal processing circuits 3, 4, and 5, the function of the external signal processing device 2 can be added to the signal processing device 1.

In the arrangement of FIG. 1, the signal processing device 1 and the external signal processing device 2 have been fabricated on a single LSI, respectively, but they may be fabricated on plural LSIs. Also in the arrangement of FIG. 1, signal transmission/reception has been made between a single signal processing circuit and selection circuit (4, 7) and the external signal processing device 2, but may be made between plural signal processing circuits and selection circuits and the external signal processing device 2.

Embodiment 2

Figure 2:
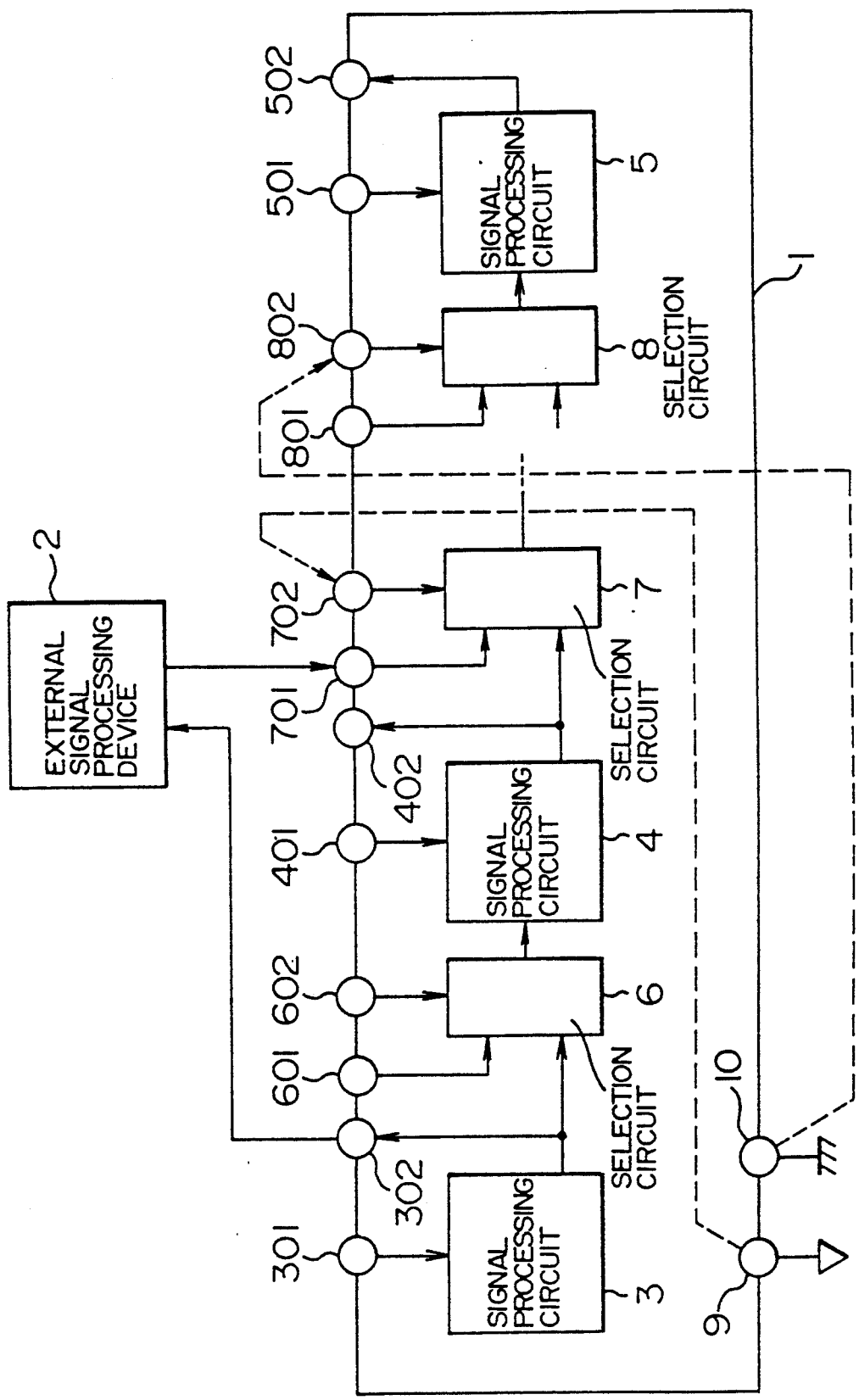
FIG. 2 is a block diagram of a second embodiment of the signal processing device according to the present invention.

FIG. 2 shows in block form a second embodiment of the signal processing device according to the present invention. This embodiment is directed to the case where a certain function, e.g., the function of the signal processing circuit 4 is to be removed in the embodiment of FIG. 1. In operation, the signal from the signal processing circuit 3 which is to be supplied to the signal processing circuit 4 with the function to be removed is sent to the external signal processing device 2 through the signal output terminal 302; the signal is subjected to delay processing involved with removal of the function of the signal processing circuit 4. This processed signal outputted from the external signal processing device 2 is supplied to a suitable signal processing circuit (not shown) in the signal processing device 1 through the signal input terminal 701. This is carried out with the aid of the selection circuit 7 on the basis of the control signal inputted from the control signal input terminal 702. Specifically, as control signals, the power potential is applied to the terminal 702 and the ground potential is applied to the terminal 802. Compensation of a partial function of the signal processing device, e.g. replacement of a specific bugged portion on a chip, can be also realized in entirely the same manner as described above.

Figure 3:
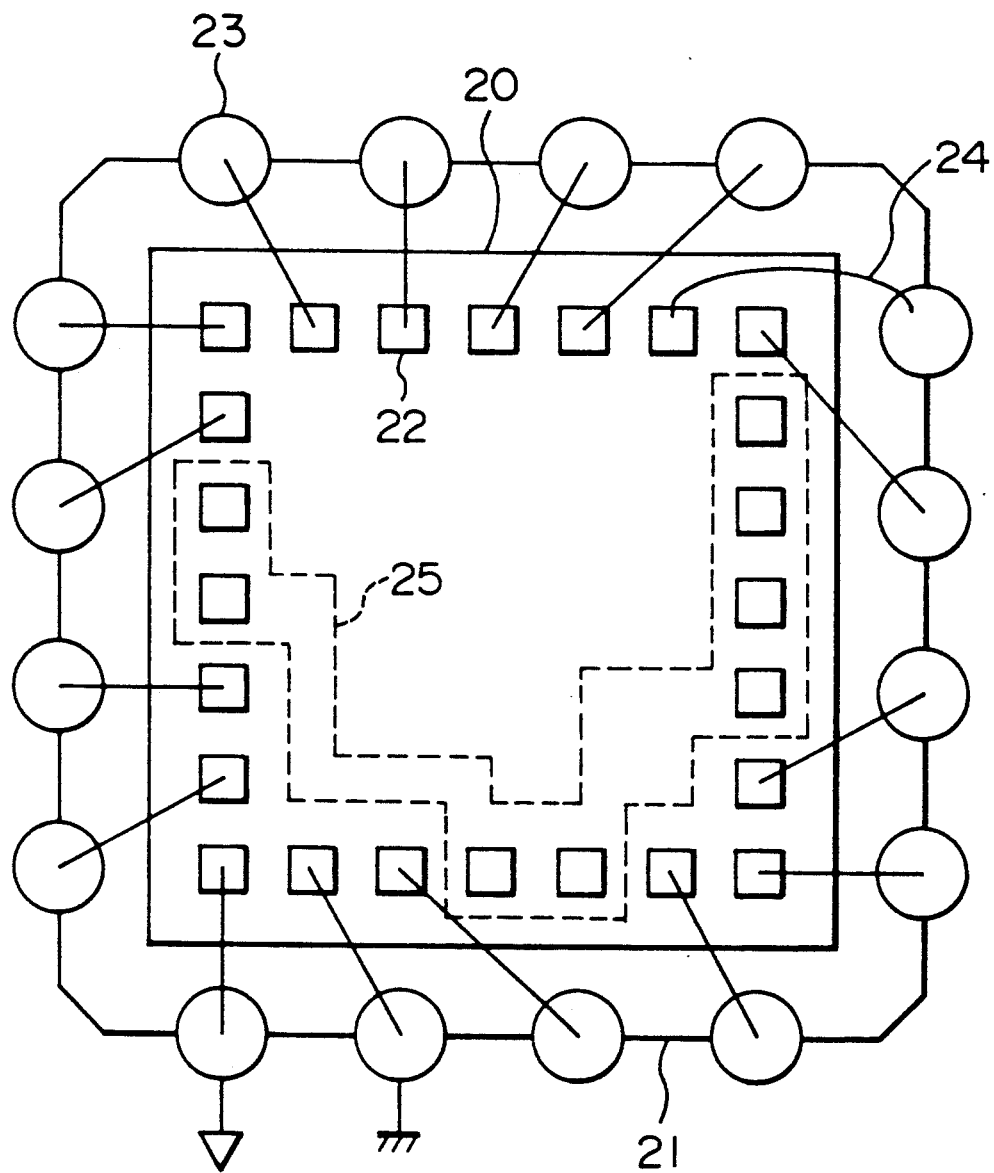
FIG. 3 is a view showing the outward appearance of a semiconductor chip and a package used in these embodiments.

FIG. 3 illustrates the semiconductor chip and package used for the signal processing device 1 of the first embodiment. As seen from FIG. 3, a semiconductor chip 20 and a package 21 are connected with each other in such a way that pads of the former are connected with I/O pins 23 by wirings 24. In order that the signal processing device 1 permits signal input/output for any signal processing circuit, the semiconductor chip 20 on which the signal processing device 1 is to be integrated must have a large number of pads 22. If it is intended that all the pads of the semiconductor chip are connected with the I/O pins of the package, a large-size and expensive package is required because of an increased number of I/O pins. However, the signal processing device as shown in FIG. 1 does not require signals to be inputted or outputted through all the pads of the semiconductor chip. Thus, since pads 25 not required particularly can be disconnected from the I/O pins to reduce the number of I/O pins, a small-size and inexpensive package can be used. In this case, where a new function is to be added, a certain function is to be removed or compensated in the signal processing device 1, the package must be replaced with a new package. If it is not required to reduce the number of I/O pins of the package, all the pads of the semiconductor chip may be connected with the I/O pins of the package.

Figures 4, 5:
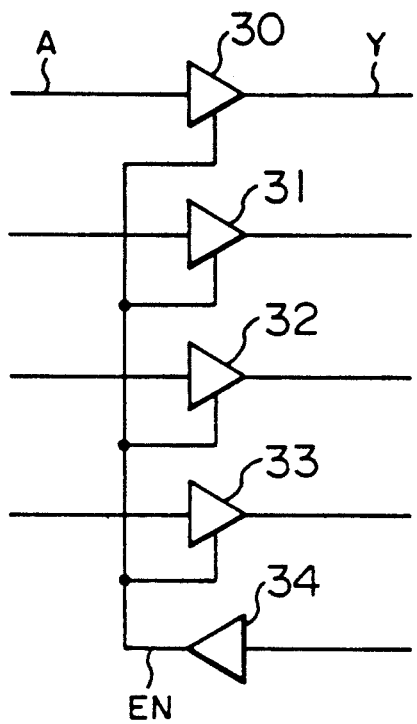
FIG. 4 is a view of the configuration of an output buffer used in the embodiments.
FIG. 5 is a table showing output conditions of the output buffer shown in FIG. 4.

FIG. 4 illustrates an arrangement of the output buffers which are located at the I/O terminals in FIG. 1 and connected with the pads 22 of the semiconductor chip 20 shown in FIG. 3. The outputs from a plurality of buffers 30, 31, 32 and 33 are controlled by a single input buffer 34. Assuming that the input value of the output buffer is A and the output value from the input buffer 34 is EN, the output value Y of e.g., the output buffer 30 is controlled as shown in FIG. 5. Specifically, if the output value EN from the input buffer 34 is "1" the output value Y from the output buffer 34 has the same value as the input value A. If the output value EN is "0" the output value from the output buffer 30 has a high impedance irrespectively of the input value A.

Generally, in order that the signal processing device 1 permits signal input/output for any signal processing circuit, the semiconductor chip 20 on which the signal processing device 1 is to be integrated must have a large number of pads 22. Further, power consumption of the semiconductor chip largely depends on the number of I/O buffers of the package. Particularly, when the logic level of the signal outputted through the output buffer shifts from "1" to "0" or from "0" to "1", a large amount of the power is consumed in the semiconductor chip. On the contrary, when the logic level of the signal inputted or outputted through the I/O buffer remains fixed, a small amount of the power is consumed. The signal processing device 1 does not require signals to be outputted from all the pads of the semiconductor chip. Since the output signal is cut off by high impedance by controlling the output buffers corresponding to the plurality of pads not required particularly, the power consumed in the semiconductor chip can be decreased.

Embodiment 3

Figure 6:
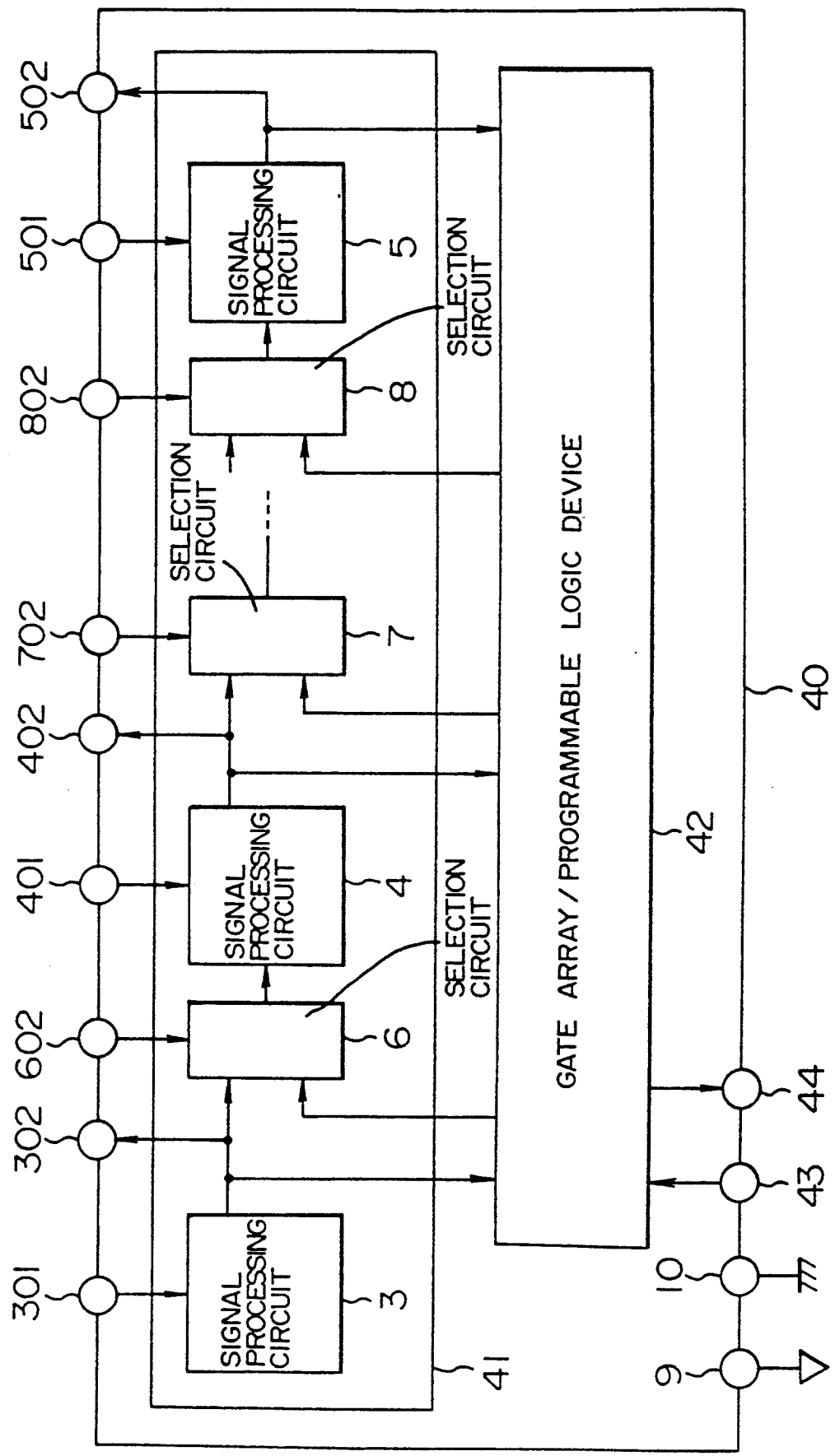
FIG. 6 is a block diagram of the signal processing device according to the present invention.

FIG. 6 shows in block form a third embodiment of the signal processing device according to the present invention. As seen from FIG. 6, a signal processing device 40 comprises a main signal processing device 41 and a subordinate signal processing device 42 which are fabricated on a monolithic semiconductor chip. The main signal processing circuit 41 and the signal I/O terminals 301, 302, 401, 402, 501, 502, 602, 702, 802, 9 and 10 may be the same as in the signal processing device in FIG. 1. The subordinate signal processing device 42 receives the signals outputted from the signal processing circuits 3, 4, and 5 and an signal inputted to the signal processing device 40 externally through an signal input terminal 43, and produces the signals to be outputted from the selection circuits 6, 7 and 8 and an signal output terminal 44. Such a signal processing device 40 can adds a new function to the main signal processing circuit 41 as follows. On the basis of the signal supplied from the main signal processing circuit or externally, the subordinate signal processing circuit 42 subjects the supplied signal to a processing necessary to provide the new function. The subordinate signal processing circuit 42 supplies the processed signal to the main signal processing circuit 41 with the aid of the selection circuit 6, 7 or 8 on the basis of the control signal inputted from the terminal 602, 702 or 802. In FIG. 6, the selection circuits 6, 7 and 8 may be controlled also by the subordinate signal processing device 42. Further, removal or compensation of a certain function in the main signal processing circuit 41 can be realized in entirely the same manner as described above.

In the arrangement of the signal processing device thus constructed, if the subordinate signal processing circuit 42 is made by a device with the circuit configuration easily changeable (e.g., a gate array, a programmable logic device and EPROM), where a new function is to be added to, a certain function is to be removed from and a partial function is to be compensated for in the main signal processing circuit 41, development cost or time involved with the changes can be greatly reduced.

As understood from the above description, in accordance with the present invention, where a new function is to be added to, a certain function is to be removed from and a partial function is to be compensated for in the device, the signal processing device can be used, as it is, without being newly designed unlike the prior art. Since the signal processing means for realizing the above changes is smaller in size than the signal processing device, development cost or time involved with the changes can be greatly reduced.

We claim:

1. A function adjustable signal processing device integrated on monolithic semiconductor chip comprising:

a first signal processing device comprising:
    a plurality of signal processing circuits for executing a plurality of predetermined signal processing stages in series, each of said signal processing circuits having an external input terminal and an external output terminal which are independent of one another;
    a plurality of selection means located between said plurality of signal processing circuits each having an additional external signal input terminal and a control input terminal, and each coupled to receive a processed signal applied to one of said external output terminals from a signal processing circuit of a preceding stage and to output one of either said received processed signal applied to said external output terminal by said signal processing circuit of said preceding stage or a signal inputted from said additional external signal input terminal, wherein said output is provided selectively, according to a predetermined state control signal applied to said control input terminal, to one of said plurality of signal processing circuits provided at a succeeding stage; and a second external signal processing device, independent from said first signal processing device, integrated on the monolithic semiconductor chip and connected to at least one of said additional external input terminals and at least one of said external output terminals.

2. A signal processing device according to claim 1, further comprising means for placing said external output terminal in a high impedance state on the basis of a predetermined control signal applied to said external output terminal.

3. A signal processing device according to claim 1, wherein a semiconductor chip is provided on said monolithic semiconductor chip having input/output pins less than the number of bonding pads.

4. A signal processing device according to claim 1, further comprising:
    a subordinate signal processing circuit formed on said same monolithic semiconductor chip, wherein:
    at least one of said external output terminal is connected to said subordinate signal processing circuit, and an output signal from said subordinate signal processing circuit is also connected to said plurality of selection means as another input, and each of said plurality of selection means outputs one of signals from a group comprised of said signal from said external output terminal, a signal inputted from at least one of said additional external signal input terminal or a signal from said subordinate signal processing circuit, selectively, according to said predetermined state control signal applied to said control input terminal, to said plurality of signal processing circuits provided at the succeeding stage.

5. A signal processing device according to claim 4, wherein said subordinate signal processing circuit is provided with signal input/output means for individually performing input/output of signals for an external device.

6. A signal processing device according to claim 4, wherein said subordinate circuit is designated by at least one of a gate array, a programmable logic and an EPROM.

7. A signal processing device according to claim 4, further comprising means for placing said external output terminal in a high impedance state on the basis of a predetermined control signal applied to said external output terminal.

8. A signal processing device according to claim 4, wherein a semiconductor chip is provided on said monolithic semiconductor chip having input/output pins less than the number of bonding pads.

* * * * *